United States Patent
Choo et al.

(10) Patent No.: US 9,627,664 B2
(45) Date of Patent: Apr. 18, 2017

(54) BATTERY MODULE OF EXCELLENT STRUCTURAL STABILITY

(71) Applicant: LG CHEM, LTD., Seoul (KR)

(72) Inventors: YeonSeok Choo, Daejeon (KR); Jin Kyu Lee, Busan (KR); Ye Hoon Im, Daejeon (KR); Kwanyong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 873 days.

(21) Appl. No.: 13/960,487

(22) Filed: Aug. 6, 2013

(65) Prior Publication Data

US 2013/0323560 A1 Dec. 5, 2013

Related U.S. Application Data

(63) Continuation of application No. 13/501,328, filed as application No. PCT/KR2010/006831 on Oct. 6, 2010, now Pat. No. 8,810,080.

(30) Foreign Application Priority Data

Oct. 13, 2009 (KR) .................. 10-2009-0097232

(51) Int. Cl.
  *H02J 7/00* (2006.01)
  *H01M 2/10* (2006.01)
  (Continued)

(52) U.S. Cl.
  CPC ....... *H01M 2/1077* (2013.01); *B60L 11/1877* (2013.01); *B60L 11/1879* (2013.01); *H01M 10/0413* (2013.01); *H01M 2220/20* (2013.01)

(58) Field of Classification Search
  USPC ........................................................ 307/150
  See application file for complete search history.

(56) References Cited

U.S. PATENT DOCUMENTS 4,178,047 A * 12/1979 Welch .................... F16B 12/22
                                                 108/60
5,857,730 A *  1/1999 Korpi .................... F41H 5/263
                                                 109/49.5
(Continued)

FOREIGN PATENT DOCUMENTS

JP             2-842 A       1/1990
JP       2001068081 A  *    3/2001
                  (Continued)

OTHER PUBLICATIONS

International Search Report issued in PCT/KR2010/006831 mailed May 19, 2011.

*Primary Examiner* — Rexford Barnie
*Assistant Examiner* — Dru Parries
(74) *Attorney, Agent, or Firm* — Birch, Stewart, Kolasch & Birch, LLP

(57) ABSTRACT

Disclosed is a battery module including a base plate on which unit modules, each with two or more secondary batteries therein, are stacked in a vertically erected state, a pair of end plates disposed in tight contact with outer surfaces of outermost unit modules while bottoms of the end plates are fixed to the base plate, and supporting bars connected between opposite sides of upper or side parts of the end plates so as to support the end plates, wherein each of the end plates includes a main body contacting a corresponding one of the unit modules, and a top wall, a bottom wall, and a pair of side walls protruding outward from the perimeter of the main body, the thickness of each of the side walls being increased from the top to the bottom wall, thereby dispersing pressure (bending load) from the unit modules and the supporting bars.

17 Claims, 7 Drawing Sheets

(51) Int. Cl.
*H01M 10/04* (2006.01)
*B60L 11/18* (2006.01)

(56) References Cited

U.S. PATENT DOCUMENTS

| | | | |
|---|---|---|---|
| 2006/0232135 | A1 | 10/2006 | Kim et al. |
| 2007/0026305 | A1 | 2/2007 | Jeon et al. |
| 2010/0187153 | A1 * | 7/2010 | Simms ................ B65D 81/053 206/586 |
| 2010/0255363 | A1 | 10/2010 | Yoon et al. |

FOREIGN PATENT DOCUMENTS

| | | |
|---|---|---|
| JP | 2002-141036 A | 5/2002 |
| JP | 2002-343324 A | 11/2002 |
| JP | 2006-40753 A | 2/2006 |
| JP | 2006-236826 A | 9/2006 |
| JP | 2006-294626 A | 10/2006 |
| JP | 2008-53019 A | 3/2008 |
| JP | 2008-159439 A | 7/2008 |
| JP | 2008-181822 A | 8/2008 |
| KR | 10-2007-0081584 A | 8/2007 |
| KR | 10-2008-0016044 A | 2/2008 |
| WO | WO 2007/094568 A1 | 8/2007 |

\* cited by examiner

US 9,627,664 B2

BATTERY MODULE OF EXCELLENT STRUCTURAL STABILITY

This application is a Continuation of application Ser. No. 13/501,328, filed Apr. 11, 2012, which is a National Phase of PCT International Application No. PCT/KR2010/006831 filed on Oct. 6, 2010, and which claims priority to Patent Application No. 10-2009-0097232, filed in the Republic of Korea on Oct. 13, 2009. The entire contents of all of the above applications are hereby incorporated by reference.

TECHNICAL FIELD

The present invention relates to a battery module with excellent structural stability, and, more particularly, to a middle or large-sized battery module including secondary batteries or unit modules, each of which has two or more secondary batteries mounted therein, stacked while being erected vertically, the battery module including a base plate, a pair of end plates, and supporting bars, wherein each of the end plates includes a main body contacting a corresponding one of the unit modules, and a top wall, a bottom wall, and a pair of side walls protruding outward from the perimeter of the main body, the thickness of each of the side walls being increased from the top wall to the bottom wall, thereby dispersing pressure (bending load) from the unit modules and the supporting bars.

BACKGROUND ART

One of the biggest problems caused from vehicles using fossil fuel, such as gasoline and diesel oil, is the creation of air pollution. A technology of using a secondary battery, which can be charged and discharged, as a power source for vehicles has attracted considerable attention as one method of solving the above-mentioned problem. As a result, electric vehicles (EV), which are operated using only a battery, and hybrid electric vehicles (HEV), which jointly use a battery and a conventional engine, have been developed. Some of the electric vehicles and the hybrid electric vehicles are now being commercially used. A nickel-metal hydride (Ni-MH) secondary battery has been mainly used as the power source for the electric vehicles (EV) and the hybrid electric vehicles (HEV). In recent years, however, the use of a lithium-ion secondary battery has been attempted.

High power and large capacity are needed for such a secondary battery to be used as the power source for the electric vehicles (EV) and the hybrid electric vehicles (HEV). To this end, a plurality of small-sized secondary batteries (unit cells) is connected in series to each other so as to form a battery module. According to circumstances, the small-sized secondary batteries (unit cells) are connected in series and in parallel to each other so as to form a battery module.

Generally, such a battery module has a structure to protect unit modules, each of which has secondary batteries mounted therein. The structure of the battery module may be various based on the kind of vehicles or installation position of the battery module in the vehicles. One of the structures to effectively fix large-capacity unit modules is based on supporting bars and end plates. This structure has an advantage in that movement of the unit modules is minimized even when load is applied to the supporting bars. To this end, however, it is necessary to sufficiently secure the strength of the supporting bars and the end plates.

In particular, for an end plate located perpendicularly to the direction in which load is applied, bending load generated due to weight of the unit modules is applied to the end plate. For this reason, the end plate must have a structure to properly distribute the bending load. If the end plate does not have a structure to properly distribute the bending load, a weak region of the end plate, such as a coupling region of the end plate or a corner of the end plate, may be severely damaged.

For example, in a structure in which corners 33 are open as in an end plate 30 of FIG. 2, the end plate 30 does not serve to support bending at all. When weight of the supporting bars and the unit modules is applied to the end plate 30 of FIG. 2, therefore, the end plate 30 is severely deformed, with the result that bent portions of the end plate 30 are damaged.

In a structure in which corners 35 of the end plate 30a are integrally connected as in an end plate 30a of FIG. 3 so as to complement the end plate 30 of FIG. 2, damage to bent portions of the end plate 30a does not occur unlike the structure of FIG. 2. However, bending load concentrates on coupling regions 37 of the end plate 30a, with the result that the coupling regions 37 are damaged.

Also, when the battery module is installed in a trunk of a vehicle, a portion of the base plate is mounted above a region where a spare tire is located due to the layout of the vehicle. That is, the battery module is installed in an asymmetrical structure. When vibration from a road surface is severe, twisting load is applied to the battery module, and the twisting load is transmitted to the end plate, with the result that the end plate may be easily damaged.

Therefore, there is a high necessity for a vertical stack type battery module having a structure to stably maintain a stacked structure of unit modules and properly disperse bending load such that bent portions or coupling regions of end plates are not damaged even when pressure from supporting bars and unit modules are applied to end plates.

DISCLOSURE

Technical Problem

Therefore, the present invention has been made to solve the above problems, and other technical problems that have yet to be resolved.

It is an object of the present invention to provide a battery module wherein end plates are configured in a specific structure in which the end plates are not deformed and have increasing resistance to stress upon application of bending load, thereby stably maintaining a stacked structure of unit modules each having secondary batteries mounted therein and minimizing damage to bent portions or coupling regions of the end plates.

It is another object of the present invention to provide a battery module wherein a portion of the structure of the battery module is formed using a portion of the shape of a vehicle, with the result that the battery module is stably installed in the vehicle, and volume of the battery module in the vehicle is minimized.

Technical Solution

In accordance with one aspect of the present invention, the above and other objects can be accomplished by the provision of a middle or large-sized battery module including secondary batteries or unit modules, each of which has two or more secondary batteries mounted therein, stacked while being erected vertically, the battery module including a base plate on which the unit modules are stacked in a vertically erected state, a pair of end plates disposed in tight contact with outer surfaces of the outermost unit modules while bottoms of the end plates are fixed to the base plate, and supporting bars connected between opposite sides of upper parts or side parts of the end plates so as to support the end plates, wherein each of the end plates includes a main body contacting a corresponding one of the unit modules, and a top wall, a bottom wall, and a pair of side walls protruding outward from the perimeter of the main body, the thickness of each of the side walls being increased from the top wall to the bottom wall, thereby dispersing pressure (bending load) from the unit modules and the supporting bars. Here, "outward" means the direction opposite to the pressure, i.e., the direction opposite to the direction in which the unit modules and the supporting bars are located on the basis of the main bodies of the end plates.

In the battery module according to the present invention, therefore, the unit modules, stacked on the base plate, are disposed in tight contact with each other by the end plates, and the end plates are fixed by the supporting bars, thereby preventing movement or swelling of the unit modules in the thickness direction. Consequently, it is possible to improve safety of the battery module and effectively preventing deterioration in performance of the battery module.

Also, each of the end plates includes a main body contacting a corresponding one of the unit modules, and a top wall, a bottom wall, and a pair of side walls protruding outward from the perimeter of the main body, and the thickness of each of the side walls is increased from the top wall to the bottom wall. Consequently, it is possible to uniformly disperse pressure (bending load) from the unit modules and the supporting bars to the top wall, the bottom wall, and the side walls.

In the present invention, each of the unit modules may be a secondary battery or a small-sized module having two or more secondary batteries mounted therein. An example of the unit module having two or more secondary batteries mounted therein is disclosed in Korean Patent Application No. 2006-12303, which has been filed in the name of the applicant of the present application. In the disclosure of this patent application, the unit module is configured in a structure in which two secondary batteries are mounted to a frame member having input and output terminals in a state in which the secondary batteries are in tight contact with each other.

Another example of the unit module is disclosed in Korean Patent Application No. 2006-20772 and No. 2006-45444, which have been filed in the name of the applicant of the present application. In the disclosures of these patent applications, the unit module is configured in a structure in which two secondary batteries are covered with a pair of high-strength cell covers in a state in which the secondary batteries are in tight contact with each other. The disclosures of the above patent applications are incorporated herein by reference. Of course, however, the structure of each of the unit module of the battery module according to the present invention is not limited to the above examples of the unit modules disclosed in the above patent applications.

In the battery module according to the present invention, each of the end plates may have various structures to effectively disperse bending load from the unit modules and the supporting bars.

As an example of such a structure, each of the side walls may be configured such that the perimeter of each of the side walls is formed in a straight line and each of the side walls is formed approximately in the shape of a right triangle when viewed in the lateral direction.

In this structure, therefore, it is possible to more effectively support bending load from the unit modules and the supporting bars than a structure in which each of the side walls is formed approximately in the shape of a rectangle when viewed in the lateral direction as in the structure of the end plate of FIGS. 2 and 3.

It is not possible to exactly understand the reason that the shape of each of the end plates effectively supports bending load; however, it is thought that, in consideration of the results of simulation, which will be described later, corners of each of the end plates are integrally formed, thereby preventing damage of bent portions of each of the end plates, and the area of the position where each of the end plates is fixed is increased, and the thickness of each of the side walls to support bending load is increased from the top wall to the bottom wall, each of the side walls is formed in the shape of a right triangle when viewed in the lateral direction, thereby dispersing load concentrating on the coupling regions of each of the end plates to the side walls and the bottom wall.

As another example of such a structure, each of the side walls may be configured such that the perimeter of each of the side walls is formed in a parabolic shape. In this structure, each of the end plates the perimeter of each of the side walls is formed in a parabolic shape, and therefore, it is possible to more slowly absorb bending load from the unit modules and the supporting bars than in a structure in which the perimeter of each of the side walls is formed in a straight line.

In this case, the parabolic shape may be various. As an example, the parabolic shape may include a shape convex outward from the bottom corner of a corresponding one of the outermost unit modules. It is possible for each of the end plates configured in this structure to maximally restrain increase in volume of the battery module and maximally effectively absorb bending load, and therefore, each of the end plates configured in this structure is particularly preferable.

As another example, the parabolic shape may include a shape concave inward toward the bottom corner of a corresponding one of the outermost unit modules.

According to the results of experiments carried out by the inventors of the present application, it is confirmed that each of the end plates configured in this structure has a greater strain than a case in which the parabolic shape includes a shape convex outward from the bottom corner of a corresponding one of the outermost unit modules but has a lower strain than a case in which the perimeter of each of the side walls is formed in a straight line.

According to circumstances, a portion of the perimeter of each of the side walls of each of the end plates may be chamfered.

Each of the end plates may be configured such that the area of each of the end plates is increased in order of the top wall, the side walls, and the bottom wall, and therefore, it is possible to easily endure pressure from the supporting bars and the unit modules in the aspect of structural dynamics.

In the above structure, each of the side walls may be configured such that the area of each of the side walls is more than 40% to 90% or more that of the bottom wall.

If the area of each of the side walls is less than 40% that of the bottom wall, it is difficult for each of the side walls to support bending load from the supporting bars and the unit modules. On the other hand, the area of each of the side walls is greater than 90% that of the bottom wall, overall volume of the battery module is increased.

More preferably, each of the side walls is configured such that the area of each of the side walls is 55% to 75% that of the bottom wall. When the area of each of the side walls is within the above-defined range, it is possible to minimize overall increase in volume of the battery module and to easily support bending load.

In a preferred example, each of the side walls may be provided with beads to exhibit more excellent durability or structural stability with respect to external force, such as twist or vibration. Shapes of the beads are not particularly restricted as long as the beads can provide structural stability with respect to external force. For example, the beads may include strip type beads formed in a convex and concave shape having a large length to width ratio, depression type beads, or protrusion type beads.

Meanwhile, the main body of each of the end plates is provided at an upper part thereof with a pair of through holes through which the respective supporting bars are inserted. Consequently, the supporting bars are inserted through the through holes of the end plates, thereby achieving easy coupling between the supporting bars and the end plates.

According to circumstances, each of the end plates may be configured such that the perimeter of each of the end plates is filleted to prevent the concentration of stress.

Consequently, the perimeter of each of the end plates is finished to have such a fillet structure, and therefore, it is possible to minimize concentration of stress on the perimeter of each of the end plates.

The supporting bars may be connected between the opposite sides of the upper parts or the side parts of the end plates.

In a structure in which the supporting bars are connected between the opposite sides of the upper parts of the end plates, the top wall of each of the end plates may protrude upward from the top of a corresponding one of the outermost unit modules such that the supporting bars are mounted to the main body of each of the end plates. Consequently, the supporting bars may be coupled to the end plates while being located above the unit modules.

The upward protruding height of the top wall of each of the end plates may be 2 to 20% the height of a corresponding one of the outermost unit modules. If the upward protruding height of the top wall of each of the end plates is less than 2% the height of a corresponding one of the outermost unit modules, it is difficult to mount the supporting bars to the end plates, or it is necessary to use supporting bars having a size corresponding thereto, with the result that overall strength of the supporting bars may be lowered. On the other hand, if the upward protruding height of the top wall of each of the end plates is greater than 20% the height of a corresponding one of the outermost unit modules, volume of the battery module is excessively increased, which is not preferable.

Each of the end plates is fixed to the base plate in a structure in which the bottom wall of each of the end plates is coupled to the base plate. Consequently, it is possible to prevent the end plates from being dislocated from the base plate when external impact is applied to the end plates.

For example, a pair of coupling holes may be formed at a portion of the bottom wall of each of the end plates, and bolts may be inserted through the coupling holes such that the end plates can be fixed to the base plate. Alternatively, coupling between the end plates and the base plate may be achieved through welding.

In accordance with another aspect of the present invention, there is provided an electric vehicle, hybrid electric vehicle, or plug-in hybrid electric vehicle using the battery module as described above as a power source, having a limited installation space, and exposed to frequent vibration and strong impact.

Of course, the battery module used as the power source for the vehicle may be combined and manufactured based on desired power and capacity.

In this case, the vehicle may be an electric vehicle, hybrid electric vehicle, or plug-in hybrid electric vehicle wherein the battery module is mounted in a trunk of the vehicle.

The electric vehicle, hybrid electric vehicle, or plug-in hybrid electric vehicle using the battery module as the power source are well known in the art to which the present invention pertains, and therefore, a detailed description thereof will not be given.

Advantageous Effects

As is apparent from the above description, the battery module according to the present invention is configured in a specific structure in which end plates are not deformed and have increasing resistance to stress upon application of bending load. Consequently, it is possible to stably maintain a stacked structure of unit modules each having secondary batteries mounted therein and to minimize damage to bent portions or coupling regions of the end plates.

Also, a portion of the structure of the battery module is formed using a portion of the shape of a vehicle. Consequently, the battery module is stably installed in the vehicle, and volume of the battery module in the vehicle is minimized.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 1:
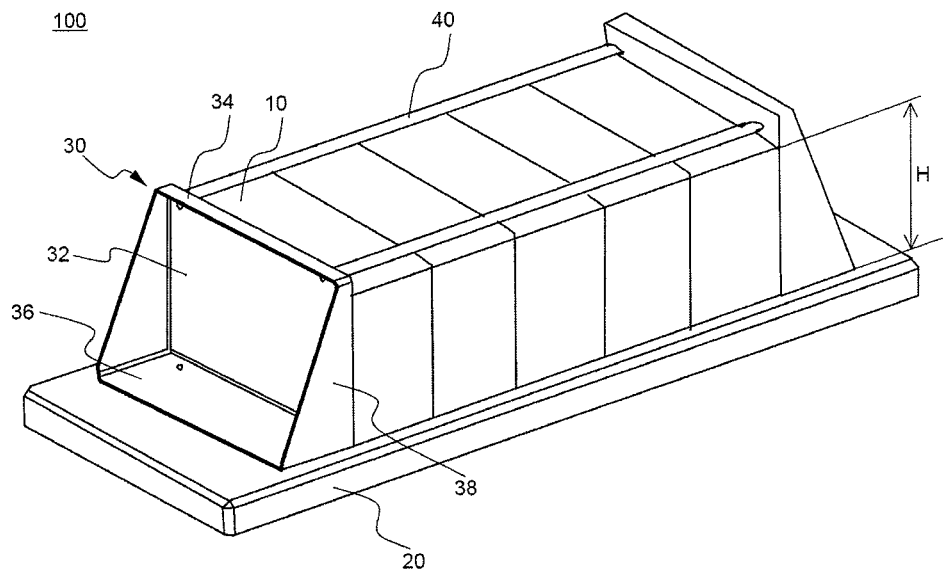
FIG. 1 is a perspective view illustrating a battery module according to an embodiment of the present invention.

FIG. 1 is a perspective view typically illustrating a battery module according to an embodiment of the present invention.

Referring to FIG. 1, a battery module 100 includes unit modules 10, each of which has secondary batteries mounted therein, a base plate 20, a pair of end plates 30, and supporting bars 40.

The unit modules 10 are stacked on the top of the base plate while the unit modules 10 are erected vertically. The end plates 30 are disposed in tight contact with the outer surfaces of the outermost unit modules 10 while the bottoms of the end plates 30 are fixed to the base plate 20.

The supporting bars 40 are connected between the upper parts of the end plates 30 so as to support the end plates 30.

Each of the end plates 30 includes a main body 32 contacting a corresponding one of the unit modules 10, and a top wall 34, a bottom wall 36 and a pair of side walls 38 protruding outward from the perimeter of the main body 32. Each of the side walls 38 is configured such that the thickness of each of the side walls 38 is increased from the top wall 34 to the bottom wall 36. Therefore, bending load from the unit modules 10 and the supporting bars 40 is dispersed from the main body 32 to the side walls 38 and the bottom wall 36 of each of the end plates 30.

The bottom wall 36 of each of the end plates 30 is fixed to the base plate 20 by welding.

Figure 4:
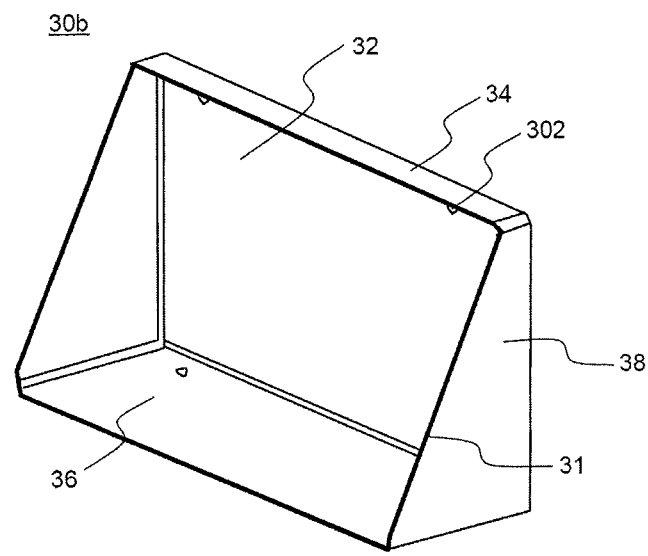
FIGS. 4 to 6 are perspective views illustrating end plates according to various embodiments of the present invention.
Figure 5:
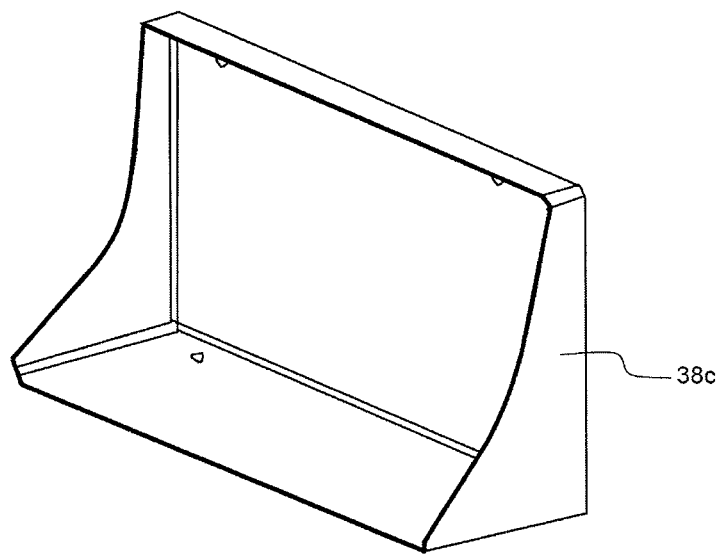
Figure 6:
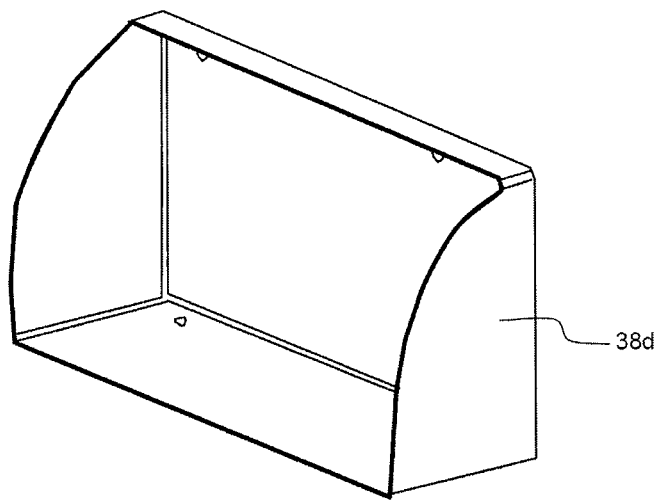
Figure 7:
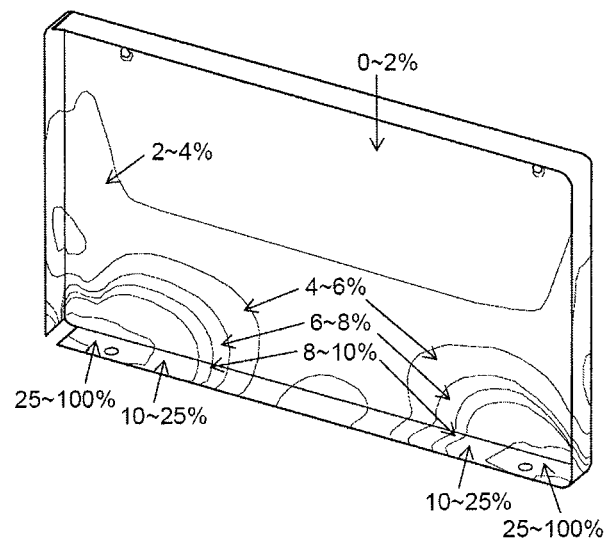
FIGS. 7 to 11 are views illustrating strains at coupling regions based on structures of the end plates of FIGS. 2 to 6.
Figure 8:
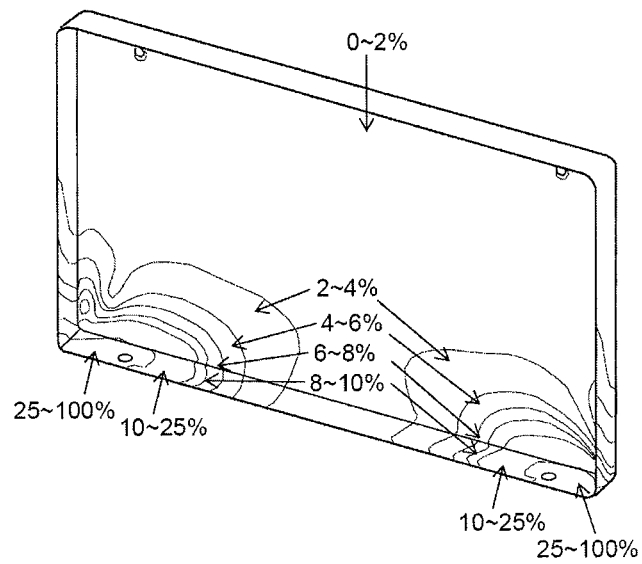
Figure 9:
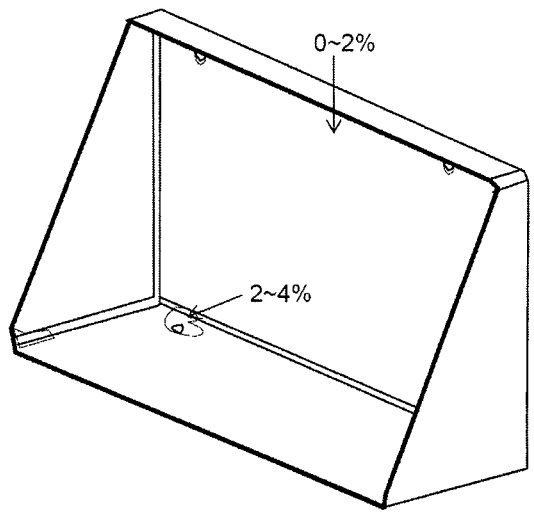
Figure 10:
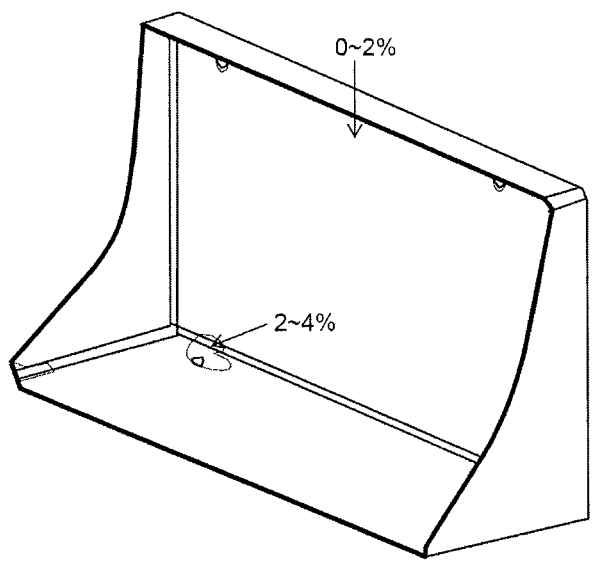
Figure 11:
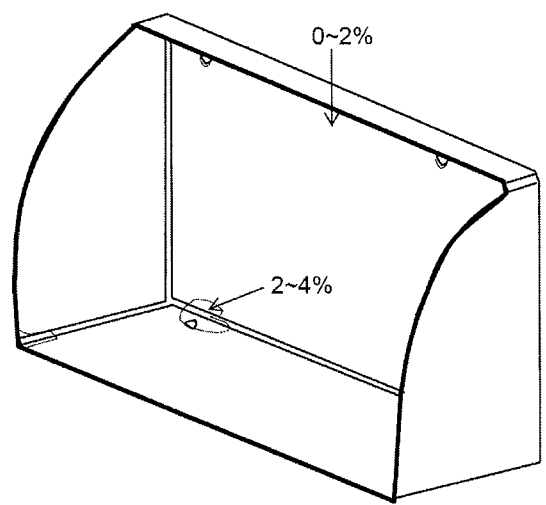

FIGS. 4 to 6 are perspective views typically illustrating end plates according to various embodiments of the present invention.

Referring first to FIG. 4 together with FIG. 1, an end plate 30b is configured such that the perimeter of each of the side walls 38 is formed in a straight line, and each of the side walls 38 is formed approximately in the shape of a right triangle when viewed in the lateral direction.

The end plate 30b is configured such that the area of the end plate 30b is increased in order of the top wall 34, the side walls 38, and the bottom wall 36. The area of each of the side walls 38 is approximately 60% that of the bottom wall 36.

In addition, a pair of through holes 302 is formed in the upper part of the main body 32 of the end plate 30b such that the supporting bars 40 can be inserted through the through holes 302. The perimeter of the end plate 30b is filleted to effectively prevent stress from the support bars 40 and the unit modules 10 from concentrating on the perimeter of the end plate 30b.

The top wall 34 of the end plate 30b protrude upward from the top of the outermost unit module 10 while having a height equivalent to 10% the height H of the outermost unit module 10 such that the supporting bars 40 can be easily mounted to opposite sides of the upper part of the end plate 30b.

Referring next to FIG. 5 together with FIG. 1, an end plate 30c is configured such that the perimeter of each of the side walls 38 is formed in the shape of a parabola concave inward toward a bottom corner of the outermost unit module 10.

Referring finally to FIG. 6 together with FIG. 1, an end plate 30d is configured such that the perimeter of each of the side walls 38 is formed in the shape of a parabola convex outward from a bottom corner of the outermost unit module 10.

The end plates of FIGS. 2 to 6 were fixed to the battery module as shown in FIG. 1, and simulation for strain and maximum stress was carried out to confirm strains at coupling regions based on structures of the end plates of FIGS. 2 to 6.

Accurate sizes and shapes of the end plates are shown in FIGS. 7 to 11, which also shows stress distributions. In addition, Table 1 below indicates relative strains and maximum stresses based on structures of the end plates of FIGS. 3 to 6 (FIGS. 8 to 11) on the assumption that the strain and maximum stress based on the structure of the end plate 30 of FIG. 2 (FIG. 7) are 100.00%.

TABLE 1

Figure 2:
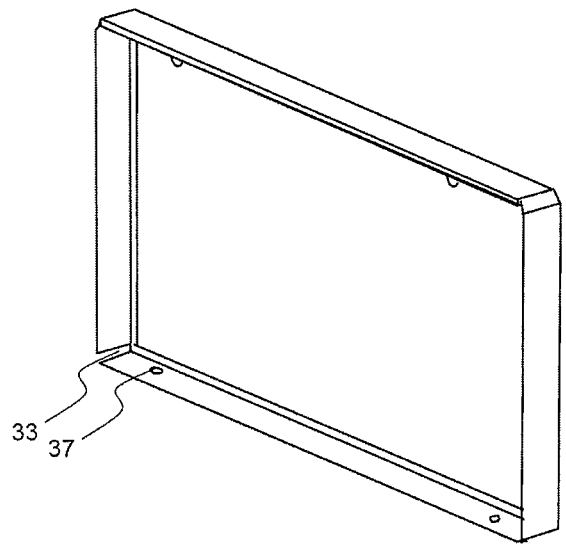
FIGS. 2 and 3 are perspective views illustrating conventional end plates.
Figure 3:
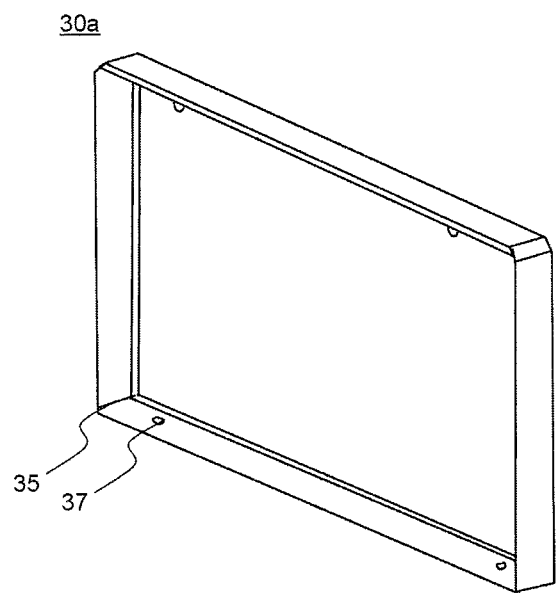

| Structure of End plate | Strain (relative value) | Maximum stress (relative value) |
| --- | --- | --- |
| Structure shown in FIG. 2 | 100.00% | 100.00% |
| Structure shown in FIG. 3 | 71.10% | 91.80% |
| Structure shown in FIG. 4 | 1.84% | 11.20% |
| Structure shown in FIG. 5 | 1.91% | 11.30% |
| Structure shown in FIG. 6 | 1.80% | 11.20% |

As can be seen from FIGS. 7 to 11, the end plate 30 of FIG. 2 and the end plate 30a of FIG. 3 exhibit generally high stress distributions at the lower part of the main body and the lower part of each of the side walls, and the bottom wall. In particular, a very high stress distribution appears at a region of the bottom wall where the bottom wall is coupled to the base plate. The region having the high stress distribution may be easily broken upon application of external force.

On the other hand, Table 1 reveals that the end plate 30b of FIG. 4 has a strain of 1.84% and a maximum stress of 11.20%, which are much lower than the strains and the maximum stresses of the end plates 30 and 30a of FIGS. 2 and 3.

Also, it can be seen that the end plate 30b of FIG. 6 has a strain of 1.80% and a maximum stress of 11.20%, and the strain of the end plate 30b of FIG. 6 is lower than the strains of the end plates 30b and 30c of FIGS. 4 and 5.

Comparative values of the end plates 4 of FIGS. 4 to 6 under the same simulation conditions are indicated in Table 2 below. The comparative values are relative strains and maximum stresses based on the structures of the end plates of FIGS. 5 and 6 (FIGS. 10 and 11) on the assumption that the strain and maximum stress based on the structure of the end plate 30b of FIG. 4 (FIG. 7) are 100.00%.

TABLE 2

| Structure of End plate | Strain (relative value) | Maximum stress (relative value) |
| --- | --- | --- |
| Structure shown in FIG. 4 | 100.00% | 100.00% |
| Structure shown in FIG. 5 | 104.20% | 101.10% |
| Structure shown in FIG. 6 | 97.92% | 99.67% |

As can be seen from Table 2 above, the end plate 30d of FIG. 6 has a strain of 97.92% and a maximum stress of 99.67%, which are lower than the strains and the maximum stresses of the end plates 30b and 30c of FIGS. 4 and 5. It is not possible to accurately determine a relationship between the shape of each side wall of an end plate and a strain (and a maximum stress); however, it can be seen that the end plate 30d of FIG. 6 is the most excellent in supporting bend load from the supporting bars and the unit modules of the battery module as shown in FIG. 1. Consequently, it is possible to reduce the strain and the maximum stress by only partially changing the shape of each side wall of the end plate the thickness of which is increased from the top wall to the bottom wall, which is an unexpected result.

Figure 12:
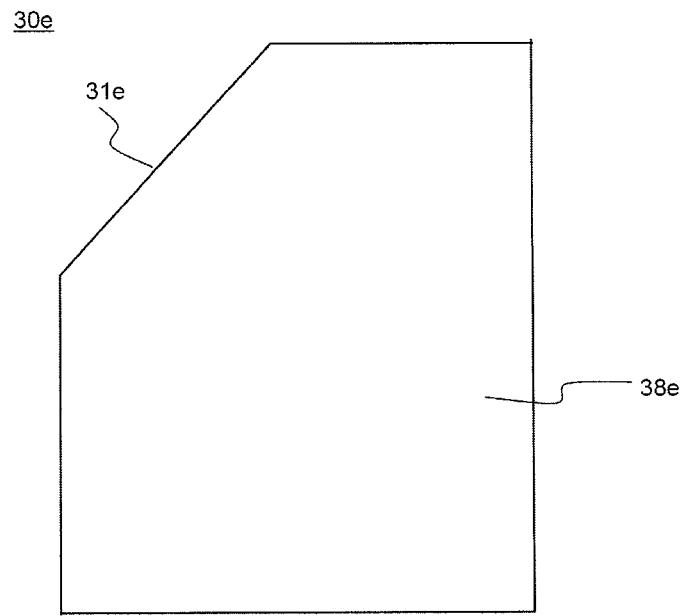
FIGS. 12 and 13 are side views typically illustrating end plates according to other embodiments of the present invention.

FIG. 12 is a side view typically illustrating an end plate according to another embodiment of the present invention.

An end plate 30e of FIG. 12 is identical in structure to the end plates 30b, 30c, and 30d of FIGS. 4 to 6 except that a portion of the perimeter 31e of the side wall 38e is chamfered, and therefore, a detailed description thereof will not be given.

Figure 13:
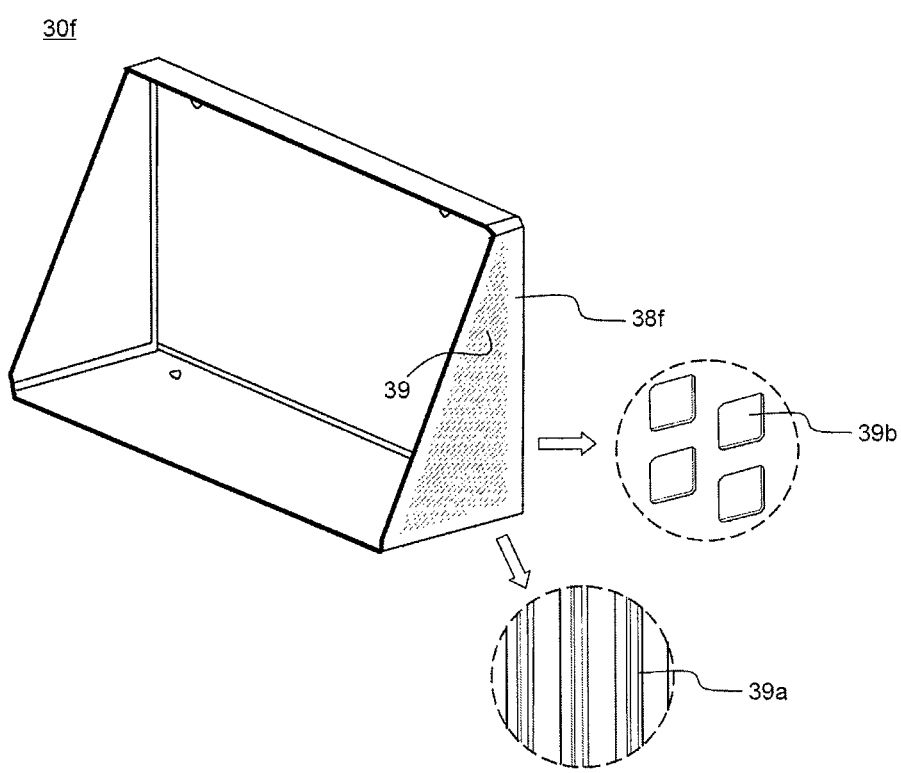

FIG. 13 is a side view typically illustrating an end plate according to yet another embodiment of the present invention.

An end plate 30f of FIG. 13 is characterized in that beads 39 are formed at each side wall 38f so as to exhibit more excellent durability or structural stability with respect to external force, such as twist or vibration.

The beads 39 may be formed over the entire surface of each side wall 38f or partially at the surface of each side wall 38f. Also, the beads 39 may include strip type beads 39a formed in a convex and concave shape having a large length to width ratio. Alternatively, the beads 39 may include a plurality of independent depression type beads 39b or a plurality of independent protrusion type beads (not shown). Of course, the beads 39 may be configured in various other shapes.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A middle or large-sized battery module comprising secondary batteries or unit modules, each of which has two or more secondary batteries mounted therein, stacked while being erected vertically, the battery module comprises:
a base plate on which the unit modules are stacked in a vertically erected state;
a pair of end plates disposed in tight contact with outer surfaces of the outermost unit modules while bottoms of the end plates are fixed to the base plate; and
supporting bars connected between opposite sides of upper parts or side parts of the end plates so as to support the end plates, wherein
each of the end plates comprises a main body contacting a corresponding one of the unit modules, and a top wall, a bottom wall, and a pair of side walls protruding outward from a perimeter of the main body, a thickness of each of the side walls being increased from the top wall to the bottom wall, thereby dispersing pressure (bending load) from the unit modules and the supporting bars, the bottom wall extending the entire length of the bottom of the end plate and the bottom wall remaining in contact with the base plate throughout the entire length of the bottom wall,
the corners of each of the end plates are chamfered, and the corners of each of the end plates are integrally formed.

2. The battery module according to claim 1, wherein each of the side walls is configured such that a perimeter of each of the side walls is formed in a straight line and each of the side walls is formed approximately in the shape of a right triangle when viewed in a lateral direction.

3. The battery module according to claim 1, wherein each of the side walls is configured such that a perimeter of each of the side walls is formed in a parabolic shape.

4. The battery module according to claim 3, wherein the parabolic shape comprises a shape convex outward from a bottom corner of a corresponding one of the outermost unit modules.

5. The battery module according to claim 3, wherein the parabolic shape comprises a shape concave inward toward a bottom corner of a corresponding one of the outermost unit modules.

6. The battery module according to claim 1, wherein each of the end plates is configured such that an area of each of the end plates is increased in order of the top wall, the side walls, and the bottom wall.

7. The battery module according to claim 6, wherein each of the side walls is configured such that an area of each of the side walls is more than 40% to 90% or more that of the bottom wall.

8. The battery module according to claim 7, wherein each of the side walls is configured such that the area of each of the side walls is 55% to 75% that of the bottom wall.

9. The battery module according to claim 1, wherein each of the side walls is provided with beads to improve structural stability with respect to external force.

10. The battery module according to claim 9, wherein the beads comprise strip type beads formed in a convex and concave shape having a large length to width ratio, depression type beads, or protrusion type beads.

11. The battery module according to claim 1, wherein the main body of each of the end plates is provided at an upper part thereof with a pair of through holes through which the respective supporting bars are inserted.

12. The battery module according to claim 1, wherein each of the end plates is configured such that a perimeter of each of the end plates is filleted to prevent concentration of stress.

13. The battery module according to claim 1, wherein the top wall of each of the end plates protrudes upward from a top of a corresponding one of the outermost unit modules such that the supporting bars are mounted to the main body of each of the end plates.

14. The battery module according to claim 13, wherein the upward protruding height of the top wall of each of the end plates is 2 to 20% a height of a corresponding one of the outermost unit modules.

15. The battery module according to claim 1, wherein each of the end plates is fixed to the base plate in a structure in which the bottom wall of each of the end plates is coupled to the base plate.

16. An electric vehicle, hybrid electric vehicle, or plug-in hybrid electric vehicle using the battery module according to claim 1 as a power source.

17. The electric vehicle, hybrid electric vehicle, or plug-in hybrid electric vehicle according to claim 16, wherein the battery module is mounted in a trunk of the vehicle.

* * * * *